United States Patent [19]

Blum

[11] Patent Number: 4,980,412

[45] Date of Patent: Dec. 25, 1990

[54] AQUEOUS SOLUTIONS OR DISPERSIONS OF SELF-CROSSLINKING BINDERS, A PROCESS FOR THEIR PRODUCTION AND THEIR USE

[75] Inventor: Harald Blum, Wachtendonk, Fed. Rep. of Germany

[73] Assignee: Bayer Aktiengesellschaft, Leverkusen-Bayerwerk, Fed. Rep. of Germany

[21] Appl. No.: 441,751

[22] Filed: Nov. 27, 1989

[30] Foreign Application Priority Data

Dec. 6, 1988 [DE] Fed. Rep. of Germany ....... 3841021

[51] Int. Cl.$^5$ .............................................. C08L 37/00
[52] U.S. Cl. ................................... 524/531; 524/549; 525/327.3; 525/327.4
[58] Field of Search ......................... 525/327.3, 327.4; 524/531, 549, 461, 457

[56] References Cited

U.S. PATENT DOCUMENTS 4,904,740 2/1990 Blum et al. ...................... 525/327.3

*Primary Examiner*—Joseph L. Schofer
*Assistant Examiner*—Jeffrey T. Smith
*Attorney, Agent, or Firm*—Connolly and Hutz

[57] ABSTRACT

Aqueous solutions or dispersions of self-crosslinking binders based on ionically modified polycarboxylic acid polyanhydrides, wherein the binders dissolved or dispersed in water have (a) a total content of lateral carboxylic acid ester, carboxylic acid thioester or carboxylic acid amide groups of up to 500 milliequivalents per 100 grams solids, (b) a content of chemically incorporated carboxylate groups of from 10 to 500 milliequivalents per 100 grams solids and (c) a content of ammonium groups of from 10 to 500 milliequivalents per 100 grams solids, are prepared which comprises a first reaction step wherein polyanhydrides (A) containing intramolecular carboxylic anhydride groups are at least partly reacted, with or without inert solvents, with blocked amines (B) which are activatible by water and which, in addition to blocked amino groups, contain at least one anhydride-reactive hydroxy, mercapto or amino group, in a molar ratio of anhydride groups to anhydride-reactive groups of 10:1 to 0.8:1 in an ester-, thioester- or amide-forming reaction accompanied by ring opening, and a second reaction step wherein the reaction mixture obtained from the first step is diluted with water and stirred at room temperature or higher until a stable aqueous solution or dispersion is formed.

5 Claims, No Drawings

AQUEOUS SOLUTIONS OR DISPERSIONS OF SELF-CROSSLINKING BINDERS, A PROCESS FOR THEIR PRODUCTION AND THEIR USE

This invention relates to new aqueous solutions or dispersions of self-crosslinking binders based on ionically modified polycarboxylic polyanhydrides, to a process for their production by a two-stage modification reaction of the polyanhydrides and to their use as coating compositions or adhesives or for the production of coating compositions or adhesives.

BACKGROUND OF THE INVENTION

Aqueous paint systems based on water-dilutable or water-soluble stoving binders have the advantage that they contain only small quantities of organic solvents which are lost during hardening and which pollute the environment or necessitate expensive absorption or incineration plants. The solubility of these binders in water is generally attributable to the presence of chemically incorporated, amine-neutralized acid groups, particularly carboxyl groups, or chemically incorporated acid-neutralized tertiary amino groups (cf. for example DE-OS 2749691, EP-A-218 906 or L. Dulog, Die Angew. Makro. Chemie 123/124 (1984), pages 437 et seq).

During the hardening of coatings containing such binders, the volatile neutralizing agents are eliminated again so that the films become insoluble in water.

Where the quality of the coatings has to meet certain requirements, for example where the coatings are required to show high solvent resistance, the coatings are normally hardened at elevated temperature using crosslinking resins. Known crosslinking resins for this purpose are, for example, etherified melamine resins or even blocked polyisocyanates (cf. for example Wagner/Sarx, Lack-Kunstharze, Carl Hanser Verlag Munchen 1971, pages 71 et seq and pages 161 et seq).

One feature common to all these crosslinking resins is that low molecular weight volatile cleavage products which are not incorporated in the coatings are formed during the crosslinking reactions (Journal of Paint Technology 46, no. 593 (1974), pages 46 et seq; Progress in Org. Coatings 12, (1984), pages 309 et seq).

BRIEF DESCRIPTION OF THE INVENTION

The object of the present invention is to provide water-dilutable or water-soluble binders which contain little, if any, auxiliary organic solvent and preferably no auxiliary organic solvent and no volatile neutralizing agents, emulsification aids or dispersion aids. The binders can be converted into the crosslinked state by heat treatment without the addition of crosslinking resins. Also in the absence of cleavage products, the aqueous solutions or dispersions of the binders are stable in storage and the coatings produced therefrom have high water and solvent resistance.

This object is achieved by the provision of the aqueous solutions or dispersions of self cross-linking binders based on ionically modified polycarboxylic acid polyanhydrides having lateral carboxylic acid ester groups, chemically incorporated carboxylate groups and ammonium groups.

DETAILED DESCRIPTION

The present invention relates to aqueous solutions or dispersions of self-crosslinking binders based on ionically modified polycarboxylic polyanhydrides, characterized in that the binders dissolved or dispersed in water have
(a) a content of lateral carboxylic acid ester, carboxylic acid thioester and/or carboxylic acid amide groups of up to 500 milliequivalents per 100 g solids,
(b) a content of chemically incorporated carboxylate groups of from 10 to 500 milliequivalents per 100 g solids and
(c) a content of ammonium groups of from 10 to 500 milliequivalents per 100 g solids.

The present invention also relates to a process for the production of these solutions or dispersions which is characterized in that, in a first reaction step, polyanhydrides (A) containing intramolecular carboxylic anhydride groups are at least partly reacted, optionally in the presence of inert solvents, with blocked amines (B) which can be activated by water and which, in addition to the blocked amino groups, contain at least one anhydride-reactive hydroxy, mercapto or amino group, in a molar ratio of anhydride groups to anhydride-reactive groups of 10:1 to 0.8:1 in an ester-, thioester- or amide-forming reaction accompanied by ring opening and in a second reaction step, the reaction mixture thus obtained is diluted with water and stirred at room temperature or, optionally, elevated temperature until a stable aqueous solution or dispersion is formed, any volatile organic constituents present in the mixture optionally being distilled off at the same time.

Finally, the present invention also relates to the use of the solutions or dispersions according to the invention as aqueous coating compositions or adhesives or for the production of aqueous coating compositions or adhesives.

Low molecular weight cyclic dianhydrides, such as for example pyromellitic dianhydride or benzophenone-3,3,4,4,-tetracarboxylic dianhydride, may be used as the polyanhydrides (A).

Reaction products containing at least two anhydride groups of at least difunctional alcohols, amines or aminoalcohols with excess quantities of dianhydrides are also suitable.

It is also possible to use graft products, Diels-Alder adducts or ene adducts of maleic anhydride and polyunsaturated substances such as, for example, liquid low molecular weight polybutadienes, butadiene copolymers, soybean oil, linseed oil, wood oil, tall oil, castor oil, coconut oil, peanut oil, sunflower oil, cottonseed oil.

However, component A) preferably consists of intramolecular copolymers containing anhydride groups of
  (a) 0.1 to 45 parts by weight maleic anhydride,
  (b) 0 to 95 parts by weight monomers corresponding to the following formula

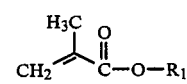

and/or to the following formula

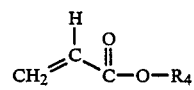

(c) 0 to 95 parts by weight monomers corresponding to the following formula

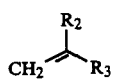

(d) 0 to 10 parts by weight polyunsaturated copolymerizable compounds;

in the above formulae:

R$_1$ is an aliphatic or cycloaliphatic C$_{1-12}$ hydrocarbon radical optionally containing oxygen, sulfur or nitrogen as heteroatom, R$_2$ is hydrogen, a methyl or ethyl group or chlorine or fluorine, R$_3$ is an aliphatic C$_{2-15}$ hydrocarbon radical, a cycloaliphatic C$_{5-10}$ hydrocarbon radical, an araliphatic C$_{7-18}$ hydrocarbon radical, an aromatic C$_{6-12}$ hydrocarbon radical, chlorine, fluorine, a nitrile group or a C$_{2-18}$ hydrocarbon radical which contains one or more heteroatoms from the group consisting of oxygen, sulfur and nitrogen in the form of ether, ester, amide, urethane, urea, thioester, thioether, oxirane, ketone, lactam or lactone groups, and R$_4$ corresponds in its meaning to the definition given for R$_1$.

Accordingly, component (A) preferably consists of copolymers of maleic anhydride with monomers of the type mentioned above under (b), (c) and (d).

Preferred monomers (b) and (c) are those corresponding to the above general formulae in which R$_1$ is a linear or branched aliphatic C$_{1-8}$ hydrocarbon radical, R$_2$ is hydrogen or a methyl group, R$_3$ is an aromatic C$_{6-12}$ hydrocarbon radical (including aromatic radicals containing aliphatic substituents), a nitrile group, a C$_{2-9}$ carboxylate group, a C$_{2-7}$ alkoxy group or an aminocarbonyl group optionally bearing at the nitrogen a C$_{1-6}$ alkyl substituent optionally comprising ether bridges and R$_4$ corresponds in its meaning to the last definition given for R$_1$.

Typical examples of suitable or preferred substituents R$_1$ and R$_4$ are methyl, ethyl, n-propyl, isopropyl, n-butyl, isobutyl, n-pentyl, n-hexyl, 2-ethylhexyl, n-octyl, n-decyl or n-dodecyl radicals.

Typical examples of suitable and preferred substituents R$_2$ are hydrogen, methyl, ethyl, chlorine or fluorine. Typical examples of suitable and preferred substituents R$_3$ are aliphatic radicals of the type just mentioned by way of example for R$_1$, except for hydrogen and methyl, and in addition phenyl, cyclohexyl, 2-, 3- and 4-methylphenyl, propoxy, n-butoxy, acetyl, propionyl, n-butyryl or N-methoxymethyl aminocarbonyl radicals.

Preferred polyunsaturated copolymerizable compounds d) are, for example, hexane-1,6-diol bis-acrylates, trimethylolpropane bis-acrylates, trimethylolpropane tris-acrylates, pentaerythritol tris-acrylates, divinylbenzene, reaction products of at least difunctional isocyanates with equivalent quantities of hydroxyalkyl (meth)acrylates, oligomeric butadiene homopolymers and copolymers, of the type described for example in DE-AS 1 186 831, in US-PS 3,789,040 or in "Makromolekül" by H. G. Elias, 4th Edition, Hüthig and Wepf-Verlag, Basel, Heidelberg, N.Y., pages 676, 744 to 746, 1012 et seq, the butadiene homopolymers or copolymers typically having a number average molecular weight of 500 to 3,000, a Wijs iodine value of 300 to 500 g iodine/g substance, optionally containing up to 50%, based on mixture, of other comonomers, such as for example those mentioned by way of example above, and optionally bearing functional groups such as, for example, hydroxyl and carboxyl groups.

Preferred components (A) are those in which (a) 2 to 35 parts by weight and preferably 3 to 19 parts by weight maleic anhydride, (b) 10 to 80 parts by weight and more especially 35 to 80 parts by weight monomers corresponding to the following formulae

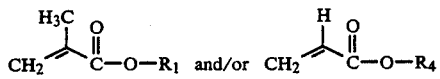

and (c) 5 to 70 parts by weight and more especially 10 to 50 parts by weight monomers corresponding to the following formula

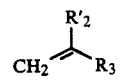

and (d) 0 to 10 parts by weight and more especially 0 to 5 parts by weight polyunsaturated copolymerizable substances, are present in copolymerized form.

Particularly preferred components (A) are those copolymers corresponding to the above definition which contain per 100 parts by weight maleic anhydride from 40 to 140 parts by weight of other monomers selected from the group consisting of styrene, vinyl toluene, α-methylstyrene, α-ethylstyrene, nucleus-substituted diethylstyrenes optionally in the form of isomer mixtures, isopropyl styrenes, butyl styrenes and methoxy styrenes, ethylvinyl ether, n-propyl vinyl ether, isopropyl vinyl ether, n-butyl vinyl ether, isobutyl vinyl ether, vinyl acetate, vinyl propionate, vinyl butyrate and mixtures of these monomers, in copolymerized form, optionally in addition to other comonomers.

Component (A), i.e. the copolymers containing succinic anhydride, generally has a weight average molecular weight, as determined by gel permeation chromatography, of from 1,500 to 200,000, preferably from 2,500 to 100,000 and more preferably from 5,000 to 35,000. Their anhydride equivalent weight (=quantity in "g" containing 1 mol anhydride groups) is from 9,800 to 217 and preferably from 2,400 to 326. The molecular weights mentioned may be determined, for example, by the method of gel permeation chromatography.

They are prepared in known manner by radical-initiated copolymerization, preferably in the presence of organic solvents.

The polymerization medium may be any of the solvents typically used in the paint industry which are inert to the monomers and the copolymers under the polymerization conditions.

Suitable solvents of this type are, for example, esters, such as ethyl acetate, propyl acetate, butyl acetate, isopropyl acetate, isobutyl acetate, sec.-butyl acetate, amyl acetate, hexyl acetate, benzyl acetate, ethyl propionate, butyl propionate, methyl glycol acetate, ethyl glycol acetate, butyl glycol acetate, ethyl diglycol acetate, ethyl glycol acetate, methyl diglycol acetate, butyl diglycol acetate, butyrolactone, propylene glycol methyl ether acetate; ethers, such as diisopropyl ether, dibutyl ether, tetrahydrofuran, dioxane, dimethyl diglycol; hydrocarbons, such as gasoline, turpentine oil, solvent naphtha, terpenes, hexane, heptane, octane, cyclohexane, toluene, xylene, ethyl benzene; ketones such as acetone, methyl ethyl ketone, methyl isobutyl ketone, methyl-n-amyl ketone, methyl isoamyl ketone, diethyl ketone, ethyl butyl ketone, diisopropyl ketone, cyclohexanone, methyl cyclohexanone, isophorone, or mixtures of such solvents.

The copolymerization is normally carried out at solids contents of 30 to 95% by weight or even in the absence of solvents.

In general, part of the solvent or the total quantity of solvent is initially introduced into the reaction vessel and the monomer mixture, initiator and, optionally, part of the solvent continuously added. After the addition, the polymerization mixture is stirred for a while. The polymerization is terminated after a monomer conversion of more than 96% and preferably more than 99% has been reached. It may be necessary to reactivate the reaction by subsequent addition of small quantities of initiator in order to achieve the required monomer conversion. With certain monomer starting compositions, the copolymer may contain relatively large quantities of residual maleic anhydride monomers after the polymerization reaction. For reasons of cost and in case this should adversely affect the application envisaged or the property level, it is of advantage to reduce this residual monomer content either by distillation or by reactivation with initiator, optionally with simultaneous addition of small quantities of a monomer mixture readily polymerizable with maleic anhydride, such as for example styrene, butyl acrylate.

It is also possible initially to introduce part of the maleic anhydride with the solvent or to add the maleic anhydride dropwise quicker than the other monomers. In certain cases, these modified production methods can improve the compatibility of the components of the binder combination.

The monomer conversion is determined by determination of the solids content of the reaction mixture and is verified by analysis of the residual monomers by gas chromatography.

It is preferred to use radical formers which are suitable for reaction temperatures in the range from 60 to 180° C., such as organic peroxides, for example dibenzoyl peroxide, di-tert.-butyl peroxide, dilauryl peroxide, tert.-butyl peroxy-2-ethyl hexanoate, tert.-butyl peroxymaleate, tert.-butyl peroxy benzoate, dicumyl peroxide, didecanoyl peroxide; and azo compounds, for example 2,2'-azo-bis-(2,4-dimethylvaleronitrile), 2,2'-azo-bis-(isobutyronitrile), 2,2'-azo-bis-(2,3-dimethylbutyronitrile), 1,1'-azo-bis-(1-cyclohexanenitrile).

The initiators may be used in quantities of from 0.5 to 10% by weight, based on total monomers. Molecular weight regulators, such as n-dodecyl mercaptan, tert.dodecyl mercaptan, mercaptoethanol, etc., may optionally be used in quantities of from 0 to 10% by weight.

The blocked amines (B) are compounds which, in addition to at least one group reactive to anhydride groups, contain at least one "blocked amino group". In the context of the invention, "blocked amino groups" are understood to be nitrogen-containing groups which are inert to anhydride groups, but which release the blocking agent under the effect of water and are converted into groups containing N-H-bonds.

Suitable blocked amines (B) are compounds which, in addition to at least one hydroxy, mercapto or primary or secondary amino group, contain at least one group corresponding to the following formula

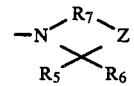

in which
Z represents —O—, —S—O or —NR$_4$ (R$_4$=C$_{1-6}$ alkyl),
R$_5$ and R$_6$ may be the same or different and represent hydrogen or inert organic radicals, preferably aliphatic C$_{1-18}$ and preferably C$_{4-10}$ hydrocarbon radicals or R$_5$ and R$_6$ together with the carbon atom of the heterocyclic ring form a cycloaliphatic ring containing in all 4 to 9 carbon atoms, more especially a cyclohexane ring, with the proviso that at most one of the substituents R$_5$ or R$_6$ is hydrogen and
R$_7$ is a C$_{2-6}$ alkylene radical.

Preferred "blocked amines" include compounds corresponding to the following formula

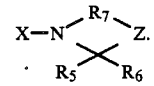

in which
Z, R$_5$, R$_6$ and R$_7$ have the meanings or rather preferred meanings just defined and
X is hydrogen or a C$_{1-12}$ and preferably C$_{2-4}$ hydroxyalkyl, mercaptoalkyl or (primary) aminoalkyl radical; in the case of the substituted alkyl radicals, at least two carbon atoms are arranged between the nitrogen atom at the heterocyclic ring and the substituent, with the proviso that, where X=H, A represents —NR$_4$—.

Particularly preferred "blocked amines" (B) are monooxazolanes or monooxazanes corresponding to the following formula

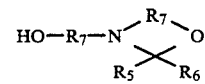

in which
R$_5$ and R$_6$ have the meanings or rather preferred meanings already defined and
the R$_7$'s may be the same or different and represent C$_{2-6}$, preferably C$_{2-4}$ alkylene radicals, with the proviso that at least 2 and preferably 2 or 3 carbon atoms are arranged between the nitrogen atom and the two oxygen atoms.

The monooxazolanes or monooxazanes corresponding to the above general formula, which are particularly suitable as synthesis component (B) according to the invention, are prepared in known manner by reaction of corresponding aldehydes or ketones having the following formula

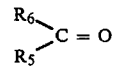

which preferably have a molecular weight in the range from 72 to 200 (ketones) or in the range from 58 to 128 (aldehydes), with suitable hydroxyamines of the type mentioned in detail hereinafter.

Suitable aldehydes are, for example, acetaldehyde, propionaldehyde, butyraldehyde, isobutyraldehyde, trimethyl acetaldehyde, 2,2-dimethyl propanal, 2-ethyl hexanal, hexanal, heptanal, octanal, valeraldehyde, benzaldehyde, tetrahydrobenzaldehyde, hexahydrobenzaldehyde, propargyl aldehyde, p-tolyl aldehyde, 2-methyl pentanal, 3-methyl pentanal, 4-methyl pentanal, sorbic aldehyde.

Particularly preferred aldehydes are butyraldehyde, isobutyraldehyde, trimethylacetaldehyde, 2,2-dimethylpropanal, 2-ethyl hexanal and hexahydrobenzaldehyde.

Suitable ketones are, for example, acetone, methyl ethyl ketone, methyl propyl ketone, methyl isopropyl ketone, methyl butyl ketone, methyl isobutyl ketone, methyl-n-amyl ketone, methyl isoamyl ketone, methyl heptyl ketone, diethyl ketone, ethyl butyl ketone, ethyl amyl ketone, diisopropyl ketone, diibutyl ketone, cyclohexanone, cyclopentanone, methyl cyclohexanone, isophorone, methyl tert.-butyl ketone, 5-methyl-3-heptanone, 4-heptyl ketone, 1-phenyl-2-propanone, acetophenone, methyl nonyl ketone, dinonyl ketone, 3,3,5-trimethyl cyclohexanone.

Particularly suitable ketones are cyclopentanone, cyclohexanone, methyl cyclopentanone, methyl cyclohexanone, 3,3,5-trimethyl cyclohexanone, cyclobutanone, methyl cyclobutanone, acetone, methyl ethyl ketone, methyl isobutyl ketone.

It is of course also possible to use mixtures of different ketones and aldehydes and also mixtures of ketones with aldehydes to obtain special properties.

The hydroxyamines used for the preparation of the monooxazolanes or monooxazanes are, in particular, organic compounds containing at least one aliphatic amino group and at least one aliphatically bound hydroxyl group. It is possible in principle, although less preferred, to use hydroxyamines containing aromatically or cycloaliphatically bound amino or hydroxyl groups. The hydroxyamines generally have a molecular weight in the range from 61 to 500 and preferably in the range from 61 to 300.

Suitable hydroxyamines may be, for example, bis-(2-hydroxyethyl)-amine, bis-(2-hydroxypropyl)-amine, bis-(2-hydroxybutyl)-amine, bis-(3-hydroxypropyl)-amine, bis-(3-hydroxyhexyl)-amine, N-(2-hydroxypropyl)-N-(2-hydroxyethyl)-amine, 2-(methylamino)-ethanol, 2-(ethylamino)ethanol, 2-(propylamino)-ethanol, 2-(butylamino)-ethanol, 2-(hexylamino)-ethanol, 2-(cyclohexylamino)-ethanol, 2-amino-2-methyl-1-propanol, 2-amino-2-ethyl-1-propanol, 2-amino-2-propyl-1-propanol, 2-amino-2-methylpropane-1,3-diol, 2-amino-3-methyl-3-hydroxybutane, aminoethanol.

Particularly preferred hydroxyamines are bis-(2-hydroxyethyl)-amine, bis-(2-hydroxypropyl)-amine, bis-(2-hydroxybutyl)-amine, bis-(3-hydroxyl)-amine, 2-(methylamino)-ethanol, 2-(ethylamino)-ethanol, 2-amino-2-methyl-1-propanol and 2-amino-2-ethyl-1-propanol.

The monooxazolanes or monooxazanes are prepared by reaction of the starting components, the quantitative ratios between the reactants generally being selected so that the hydroxyamines, based on the carbonyl groups of the aldehydes or ketones, are present in 0.5 to 1.5-fold equivalent quantities in regard to oxazolane formation. Catalytic quantities of acidic substances such as, for example, p-toluenesulfonic acid, hydrogen chloride, sulfuric acid or aluminium chloride, may optionally be used to accelerate the reaction.

Blocked amines (B), which contain a mercaptoalkyl or aminoalkyl group X and/or a group —A— with the meaning —S— or —NR$_4$—, are prepared in a largely analogous reaction using corresponding reactants for the aldehydes or ketones, for example using N,N''-dimethyl diethylenetriamine, N,N''-dimethyl dipropylenetriamine, reaction products of mercaptoethanolamine with monoepoxides such as, for example, ethylene oxide, propylene oxide, epoxybutane, glycidyl esters of versatic acid, reaction products of hydroxypropylamine or hydroxyethylamine with thiirane, reaction products of N-methyl ethylenediamine or N-methyl propylenediamine with monoepoxides or with thiirane, these compounds also being preferably reacted with the aldehydes or ketones in equivalent quantities.

All the reactions are generally carried out at a temperature in the range from 60 to 180° C., the reaction being carried out in the presence of an entraining agent to remove the water of reaction until the calculated quantity of water has been eliminated or until no more water is eliminated. The entraining agent and any unreacted starting materials present are then removed by distillation. Suitable entraining agents are, for example, toluene, xylene, cyclohexane, octane, isooctane. The crude products thus obtained may be used without further purification steps as modifying reagent for the production of the stoving binders.

To carry out the first stage of the process according to the invention, the polyanhydrides (A) are used in bulk or in the form of solutions in suitable inert solvents. "Inert solvents" are solvents which are inert both to the reactants and to the reaction products under the reaction conditions of the process according to the invention.

The solvents may be the same solvents used in the preparation of the polyanhydrides, i.e. the copolymers containing anhydride groups. Where they are used, the solvents are preferably solvents which can be removed from the reaction mixture by distillation, for example together with water by azeotropic distillation, either after or during the second stage of the process according to the invention. The solutions of polyanhydrides (A) optionally used generally have solids contents of at least 40% by weight and preferably of at least 65% by weight.

In the first stage of the process according to the invention, the reactants are used in quantities which correspond to a molar ratio of anhydride groups of component (A) to anhydride-reactive groups of component (B) of from 10:1 to 0.8:1 and preferably from 2:1 to 1:1. The reaction during the first stage of the process according to the invention generally takes place at temperatures in the range from 30° to 120° C. and preferably in the range from 50 to 90° C. over a period of 1 minute to 24 hours and preferably over a period of 5 minutes to 2 hours in the absence of moisture. The anhydride groups are at least partly reacted by reaction with the reactive groups of the blocked amines (B) with opening of the anhydride ring.

After the first stage of the process according to the invention, the reaction mixture obtained is diluted with water to carry out the second stage of the process according to the invention and is preferably stirred at 40 to 95° C. until a stable aqueous solution or dispersion of the resulting self-crosslinking binder is formed. The volatile blocking agent (aldehyde or ketone) released and the organic solvent present, if any, are preferably distilled off at the same time, optionally together with water (azeotrope). The aqueous solution or dispersion may be diluted to a ready-to-use viscosity by the addition of more water.

In general, the total quantity of water used is selected so that 20 to 45% by weight solutions or dispersions of the binders are ultimately obtained.

Binders self-crosslinking at elevated temperature are present in the aqueous solutions or dispersions obtained in this way, being characterized by (a) a content of ester, thioester or amide groups, preferably ester groups, of up to 500 and preferably from 50 to 200 milliequivalents per 100 g solids,
(b) a content of carboxylate groups of from 10 to 500 and preferably from 25 to 200 milliequivalents per 100 g solids and
(c) a content of ammonium groups of from 10 to 500 and preferably from 25 to 200 milliequivalents per 100 g solids.

In general, the content of carboxylate groups in the binder corresponds to the content of ammonium groups simultaneously present. In addition to the groups characterizing the binders mentioned under a) to c), free, i.e. non-neutralized, carboxyl groups or free, i.e. non-neutralized, amino groups may be present in the binders. In addition the binders generally contain chemically bound hydroxyl groups which are formed during the hydrolytic ring opening of the oxazolanes or oxazanes.

The reaction of the starting materials in the first stage of the process according to the invention is more or less complete, depending on the reactivity of the starting compounds, the reaction temperature and the reaction time. This means that the reaction between the anhydride groups of starting component (A) and anhydride-reactive groups of component (B) may not always be complete by the time the water is added to carry out the second stage of the process according to the invention, although this is largely irrelevant so far as the usefulness of the products obtained by the process according to the invention is concerned. If the reaction is incomplete, binders in which free ammonium groups (obtained by neutralization of the secondary amino groups present after hydrolytic ring opening of the blocked polyamines (B) by carboxyl groups formed from the anhydride groups) are present in addition to ammonium groups attached by covalent bonding (via carboxylic acid ester, carboxylic acid thioester and/or carboxylic acid amide groups) are ultimately obtained as the binders according to the invention. The observations made in regard to the content of ammonium groups include both the free ammonium groups and also the ammonium groups attached by covalent bonds. This total content of ammonium groups in turn corresponds generally to the content of chemically incorporated carboxylate groups. Those constituents of the aqueous solutions or dispersions which contain free ammonium groups are also incorporated in the sheet-form material produced from the solutions or dispersions during the thermal crosslinking thereof, so that no volatile cleavage products are eliminated during the thermal crosslinking of the binders according to the invention, even in the event of an incomplete reaction during the first stage of the process according to the invention.

Accordingly, the aqueous binders according to the invention are free from volatile neutralizing agents and contain only small quantities of organic solvent and preferably no organic solvent. They contain no additional emulsification or dispersion aids and may be hardened at elevated temperature free from cleavage products without the addition of crosslinking agents.

Auxiliaries and additives of the type mentioned by way of example hereinafter, which are typically used in paint technology, may optionally be incorporated in the binders according to the invention.

Although the binders according to the invention, dissolved or dispersed in water, are self-crosslinking systems, it may be advisable to add crosslinking resins known per se from paint technology to the aqueous solutions or dispersions in order to optimize certain applicational properties. For example, the addition of crosslinking resins enables the stoving temperatures to be reduced and/or the stoving times to be shortened and provides for the production of paint films characterized by a high crosslink density and, hence, by an increase in hardness and solvent resistance.

Suitable crosslinking resins are, for example, amide and amine/formaldehyde resins, phenolic resins, aldehyde and ketone resins, such as for example phenol-formaldehyde resins, resols, furane resins, urea resins, carbamic acid ester resins, triazine resins, melamine resins, benzoguanamine resins, cyanamide resins, aniline resins, polyepoxides, of the type described in "Lack-Kunstharze" by H. Wagner, H. F. Sarx, Carl Hanser Verlag München, 1971.

Other suitable crosslinking resins are blocked polyisocyanates, for example based on isophorone diisocyanate, hexamethylene diisocyanate, 1,4-diisocyanatocyclohexane, bis-(4-isocyanatocyclohexyl)-methane, 1,3-diisocyanatobenzene, 1,4-diisocyanato-2-methylbenzene, 1,3-bis-isocyanatomethylbenzene,2,4-bis-isocyanatomethyl-1,5-dimethyl benzene, bis-(4-isocyanatophenyl)-propane, tris-(4-isocyanatophenyl)-methane, trimethyl-1,6-diisocyanatohexane, or based on paint polyisocyanates, such as biuret polyisocyanates based on 1,6-diisocyanatohexane, isocyanurate polyisocyanates based on 1,6-diisocyanatohexane or urethane-modified paint polyisocyanates based on 2,4- and/or 2,6-diisocyanatotoluene or isophorone diisocyanate on the one hand and low molecular weight polyhydroxyl compounds, such as trimethylolpropane, the isomeric propanediols or butanediols or mixtures of such polyhydroxyl compounds on the other hand. Suitable blocking agents for these polyisocyanates are, for example, monohydric alcohols, such as methanol, ethanol, butanol, hexanol, cyclohexanol, benzyl alcohol, oximes, such as acetoxime, methyl ethyl ketoxime, lactams, such as $\epsilon$-caprolactam, or phenols.

The crosslinking resins mentioned by way of example are used, if at all, in quantities of up to 35% by weight, based on the weight of the binder free from crosslinking resin.

The paints produced using the binders according to the invention may contain as further additives, for example, standard pigments and fillers which may be both organic and also inorganic in quantities of from 30 to 180%, based on binder solids, for example titanium dioxides, iron oxides, lead oxides, zinc oxides, chromium oxides, cadmium sulfides, chromates, sulfates, silicates of calcium, magnesium, barium, strontium and aluminium, carbon black, talcum, graphite, manganese phosphate, zinc sulfide, azo dyes, phthalocyanine complexes, quinacridones, anthraquinones, thioindigo dyes and the like and also mixtures of these and other pigments.

Typical additives, such as antioxidants, levelling aids, foam inhibitors, UV absorbers, anti-sedimenting agents, etc., may also be used.

The ready-to-use lacquers typically have total solids contents of 30 to 65% and are distinguished by a low content, i.e. less than 10% and preferably less than 5%, of volatile organic substances and, more preferably, none at all.

The coating compositions containing the binders according to the invention show excellent stability in storage. Even after storage for 3 months at 40° C., there are no signs of degradation.

The binders according to the invention are particularly suitable for the production of clear varnishes and finishing paints, although they may also be used for thick-layer coatings and adhesives.

The systems according to the invention are particularly suitable for the coating of heat-resistant substrates and may be applied by the usual methods, for example by spray coating, dip coating, roll coating, spread coating or casting. Suitable substrates are optionally pre-treated materials, such as metals, glass, wood, plastics, cardboard, ceramics or paper. The binders according to the invention are also suitable for the production of printing inks for textiles and for the production of impregnating or solidifying materials for cardboard or leather.

The stoving temperatures for the systems according to the invention are generally in the range from 110° to 180° C. and, in the case of the systems free from crosslinking resins, are in the range from 130° C. to 180° C. for stoving times of 5 to 30 minutes. An airing time of 5 to 20 minutes is often favorable before the coatings are stoved. The binders according to the invention harden under the above-mentioned stoving conditions to form water-resistant and solvent-resistant films.

In the following Examples, all percentages are percentages by weight.

EXAMPLES (A) Polyanhydride intermediates

All the polyanhydrides were prepared in a nitrogen atmosphere.

($A_1$) 367 g solvent naphtha (a mixture of aromatic hydrocarbons, boiling range 165° to 180° C.) are weighed into and heated to 160° C. in a 4 liter reaction vessel equipped with a stirrer, cooling and heating system. A mixture of 500 g styrene, 1000 g n-butyl acrylate, 200 g maleic anhydride and 300 g 2-ethyl hexyl methacrylate is added over a period of 4 hours, 80 g di-tert.-butyl peroxide being added simultaneously over a period of 4.5 hours. The reaction temperature falls to 140° C. The reaction mixture is then stirred at 140° C. for 3 hours. An 85% polyanhydride A ) having an equivalent weight of 1020 g/mol (100%) is obtained.

($A_2$) 486 g dimethyl diglycol are weighed into and heated to 130° C. in a 4 liter reaction vessel equipped with a stirrer, cooling and heating system. A mixture of 400 g styrene, 900 g n-butyl acrylate, 600 g methyl methacrylate and 100 g maleic anhydride is added over a period of 4 hours, 114.3 g tert.-butyl peroctoate (70% in a mixture of hydrocarbons) being simultaneously added over a period of 5 hours. The reaction mixture is then stirred for 1 hour at 130° C. An 80% polyanhydride ($A_4$) having an equivalent weight of 2039 g/mol (100%) is obtained.

($A_3$) 486 g xylene are weighed into and heated to 128° C. in a 4 liter reaction vessel equipped with a stirrer, cooling and heating system. A mixture of 400 g methyl methacrylate, 900 g n-butyl acrylate, 400 g styrene and 300 g maleic anhydride is added over a period of 4 hours, 114.3 g tert.-butyl peroctoate (70% in a mixture of hydrocarbons) being simultaneously added over a period of 5 hours. The reaction mixture is then stirred for 1 hour at 130° C. An 80% polyanhydride A.) having an equivalent weight of 679 g/mol (100 %) is obtained.

($A_4$) 850 g xylene are weighed into and heated to 130° C. in a 5 liter reaction vessel equipped with a stirrer, cooling and heating system. A mixture of 1225 g methyl methacrylate, 1400 g n-butylacrylate, 525 g styrene and 350 g maleic anhydride is added over a period of 4 hours, 200 g tert.-butyl peroctoate (70% in a mixture of hydrocarbons) being simultaneously added over a period of 5 hours. The reaction mixture is then stirred for 1 hour at 130° C. An 80% polyanhydride $A_4$) having an equivalent weight of 1020 g/mol (100%) is obtained.

($A_5$)

419 g Polyöl 110 (a polybutadiene manufactured by Hüls AG, $M_w$1,500 to 1,800), 82 g maleic anhydride, 2.1 g Kupfersoligen (10% in xylene) and 0.2 g acetyl acetone are weighed into a 2 liter reaction vessel equipped with a stirrer and heating and cooling system, heated to 190° C. over a period of 2 hours and stirred at 190° C. for 6 hours. After cooling to 140° C. 169 g styrene, 2 g di-tert.-butyl peroxide and 0.7 g n-dodecyl mercaptan are added and the reaction mixture stirred at 140° C. until it has a solids content of more than 97%. An approximately 100% polyanhydride $A_5$) with an equivalent weight of 800 g/mol (100%) is obtained.

Modifying reagents containing blocked amino groups ($B_1$) 1000 g diisopropanolamine and 515 g isooctane are weighed into a 3 liter reaction vessel equipped with a stirrer, heating and cooling system, followed by the addition with stirring of 1058 g 2-ethyl hexanal. The mixture is then heated on a water separator until no more water of reaction is eliminated. (Theoretical quantities of water: 135 g, found: 136 g). Excess 2-ethyl hexanal and isooctane are then distilled off in a water jet vacuum. The oxazolane modifying reagent ($B_1$) with an equivalent weight of 243 g/mol is obtained.

($B_2$) 1058 g diethanolamine and 1078 g cyclohexanone are reacted in 534 g isooctane under the same conditions as in ($B_1$) to form the oxazolane modifying reagent ($B_2$) with an equivalent weight of 185 g/mol (theoretical quantity of water: 172 g, found: 163 g).

($B_3$) 1050 g diethanolamine and 792 g isobutyraldehyde are reacted in 460 g cyclohexane under the same conditions as in ($B_1$) to form the crude, approximately 90% oxazolane modifying reagent ($B_3$) with an equivalent weight of 159 g/mol (100%) (theoretical quantity of water: 180 g, found: 175 g).

Production of the binders

In all the Examples (except for Example 3 and 6), the polyanhydride and modifying reagent are used in substantially equivalent quantities (molar ratio of acid anhydride groups to hydroxyl groups=1:1).

EXAMPLE 1

900 g of the 80% polyanhydride ($A_4$) are weighed into and heated to 60° C. in a 3 liter reaction vessel equipped with a stirrer, heating and cooling system. After the addition of 121.5 g of the 90% modifying reagent ($B_3$), the reaction mixture is stirred for 15 minutes, followed by the addition of 1087 g water heated beforehand to 50° C. The reaction mixture is stirred for another 2 hours at 50 to 60° C. ,subsequently cooled to 90 C and then stirred at 90° C. for 5 hours, the blocking reagent and the xylene being removed azeotropically with water from the reaction mixture towards the end of the reaction. After dilution with water to a solids content of 33%, the aqueous self-crosslinking binder (1) is obtained, containing neither volatile neutralizing agents, nor blocking reagent nor organic solvents. Based on 100 g solids, the binder contains at most 83 milliequivalents ester groups, 83 milliequivalents carboxylate groups and 83 milliequivalents ammonium groups.

EXAMPLE 2

Binder (2) is prepared from polyanhydride A.) and modifying reagent ($B_3$) in the same way as binder (1), except that the polyanhydride and modifying reagent are stirred for 60 minutes at 80° C. before the water is added. Based on 100 g solids, the binder contains at most 83 milliequivalents ester groups, 83 milliequivalents carboxylate groups and 83 milliequivalents ammonium groups.

EXAMPLE 3

900 g of the 85% polyanhydride ($A_1$) are weighed into and heated to 70° C. in a 3 liter reaction vessel equipped with a stirrer, heating and cooling system. 1194 g of the 90% modifying reagent ($B_3$) are then added all at once and the reaction mixture homogenized for 15 minutes. 1507 g water are then added and the reaction mixture kept at 60° to 70° C. for 2 hours. It is then heated to the reflux temperature and blocking reagent and solvent are distilled off azeotropically with water.

After 6 hours, the dispersion is adjusted to a solids content of 30% by the addition of water. The aqueous self-crosslinking binder (3) is obtained, containing neither volatile neutralizing agents nor blocking reagent nor organic solvents. Based on 100 g solids, the binder contains at most 78 milliequivalents ester groups, 78 milliequivalents carboxylate groups and 78 milliequivalents ammonium groups. 0.9 equivalent modifying reagent were used per anhydride equivalent.

EXAMPLE 4

600 g polyanhydride A ) and 121.6 g modifying reagent ($B_1$) and also 1082 g water are reacted in the same way as described in Example (3). The aqueous, self-crosslinking binder (4) is obtained in the form of an approximately 30% aqueous dispersion or solution. Based on 100 g solids, the binder contains at most 79 milliequivalents ester groups, 79 milliequivalents carboxylate groups and 79 milliequivalents ammonium groups.

EXAMPLE 5

600 g polyanhydride ($A_1$) and 92.6 g modifying reagent ($B_2$) and also 1030 g water are reacted in the same way as described in Example (3). The aqueous, self-crosslinking binder (5) is obtained with a solids content of approximately 30%. Based on 100 g solids, the binder contains at most 83 milliequivalents ester groups, 83 milliequivalents carboxylate groups and 83 milliequivalents ammonium groups.

EXAMPLE 6

Binder (6) is prepared in the same way as described in Example (1), except that only ⅔ equivalent of modifying reagent ($B_3$) are added per anhydride equivalent of polyanhydride ($A_4$). The aqueous self-crosslinking binder (6) is obtained with a solids content of 33%. Based on 100 g solids, the binder contains at most 55 milliequivalents ester groups, 55 milliequivalents carboxylate groups and 55 milliequivalents ammonium groups.

EXAMPLE 7

900 g polyanhydride ($A_2$), 62.4 g modifying reagent ($B_3$) and 1273 g water are reacted in the same way as described in Example 1. The aqueous, self-crosslinking binder (7) is obtained with a solids content of 36%. Based on 100 g solids, the binder contains at most 45 milliequivalents ester groups, 45 milliequivalents carboxylate groups and 45 milliequivalents ammonium groups.

EXAMPLE 8

900 g polyanhydride ($A_3$), 187 g modifying reagent ($B_3$) and 1504 g water are reacted in the same way as described in Example (1) except that the polyanhydride and modifying reagent are stirred for 3 hours at 80° C. before the water is added. The aqueous self-crosslinking binder (8) is obtained with a solids content of approximately 31%. Based on 100 g solids, the binder contains at most 119 milliequivalents ester groups, 119 milliequivalents carboxylate groups and 119 milliequivalents ammonium groups.

EXAMPLE 9

670 g polyanhydride A° ), 142.5 g modifying reagent ($B_3$) and 1550 g water are reacted as described in Example 1. The aqueous self-crosslinking binder 9) is obtained with a solids content of approximately 34%. Based on 100 g solids, the binder contains at most 101 milliequivalents ester groups, 101 milliequivalents carboxylate groups and 101 milliequivalents ammonium groups.

COMPARISON EXAMPLE

The procedure is as in Example (1), except that 600 g polyanhydride ($A_4$) are reacted with 54.8 g diethanolamine and then 800 g water. An aqueous resin solution having a solids content of 35% is obtained.

The self-crosslinking binders obtained in Examples 1 to 9 and the comparison binder are applied to glass plates in a wet film thickness of 210 μm and, after airing for 15 minutes at room temperature, are stoved for 30 minutes at 140° to 150° C. Clear, crosslinked coatings having excellent water and solvent resistance are obtained.

Water resistance was determined by placing a water-soaked cotton wool plug on the coating. Solvent resistance was determined by a wiping test using an acetone-impregnated cotton wool plug. The results are expressed as the number of double wipes with no visible change in the film.

| Example | Stoving conditions | Water resistance | Solvent resistance |
| --- | --- | --- | --- |
| 1 | 30'/150° C. | >3 days O.K.* | 300 O.K. |
| 2 | 30'/150° C. | >3 days O.K. | 300 O.K. |

EXAMPLES 10 to 19

(Examples using crosslinking resins)

The aqueous binders prepared in accordance with Examples 1, 4, 5 and 7 are mixed with the crosslinking resins mentioned below in a ratio by weight of binder to crosslinking resin of 80:20 (100% in either case), adjusted to processing viscosity (approx. 100 mPa.s), applied to glass plates in a wet film thickness of 210 μm and stoved for 30 minutes after airing for 15 minutes at room temperature. Clear, crosslinked coatings having excellent resistance to solvents and water (determined as described above) are obtained.

| Example | Stoving conditions | Water resistance | Solvent resistance |
|---|---|---|---|
| 3 | 30'/140° C. | >3 days O.K. | 200 O.K. |
| 4 | 30'/150° C. | >3 days O.K. | 200 O.K. |
| 5 | 30'/140° C. | >3 days O.K. | 200 O.K. |
| 6 | 30'/150° C. | >3 days O.K. | 300 O.K. |
| 7 | 30'/140° C. | >3 days O.K. | 300 O.K. |
| 8 | 30'/140° C. | >3 days O.K. | 300 O.K. |
| 9 | 30'/150° C. | >2 days O.K. | 300 O.K. |
| Comp. | 30'/150° C. | 1 day cloudy | 30 dissolved |

*days O.K. = days without change

| Example | Binder of Example no. | Crosslinking resin | Stoving temperature | Solvent resistance | Water resistance |
|---|---|---|---|---|---|
| 10 | 1 | ® Sacopal M 232 | 130° C. | 200 O.K. | >2 days O.K. |
| 11 | 4 | ® Cymel 327 | 130° C. | 200 O.K. | >2 days O.K. |
| 12 | 4 | ® Sacopal B 421 | 130° C. | 200 O.K. | >2 days O.K. |
| 13 | 4 | ® Sacopal M 232 | 130° C. | 200 O.K. | >2 days O.K. |
| 14 | 4 | ® Sacopal M 244 | 130° C. | 200 O.K. | >2 days O.K. |
| 15 | 5 | ® Cymel 327 | 120° C. | 200 O.K. | >2 days O.K. |
| 15 | 5 | ® Sacopal B 421 | 120° C. | 200 O.K. | >2 days O.K. |
| 17 | 5 | ® Sacopal M 232 | 120° C. | 200 O.K. | >2 days O.K. |
| 18 | 5 | ® Sacopal M 244 | 110° C. | 200 O.K. | >2 days O.K. |
| 19 | 7 | ® Sacopal M 232 | 130° C. | 200 O.K. | >2 days O.K. |

® Cymel 327: melamine-formaldehyde resin, American Cyanamid
® Sacopal B 421: urea resin, Krems Chemie
® Sacopal M 244: melamine resin, Krems Chemie
® Sacopal M 232: melamine resin, Krems Chemie

What is claimed is:

1. A process for the production of the aqueous solutions or dispersions of self-crosslinking binders having
   (a) a total content of lateral carboxylic acid ester, carboxylic acid thioester or carboxylic acid amide groups of up to 500 milliequivalents per 100 grams solids,
   (b) a content of chemically incorporated carboxylate groups of from 10 to 500 milliequivalents per 100 grams solids and
   (c) a content of ammonium groups of from 10 to 500 milliequivalents per 100 grams solids which comprises:
   a first reaction step wherein polyanhydrides (A) containing intramolecular carboxylic anhydride groups are at least partly reacted, with or without inert solvents, with blocked amines (B) which are activatible by water and which, in addition to blocked amino groups, contain at least one anhydride-reactive hydroxy, mercapto or amino group, in a molar ratio of anhydride groups to anhydride-reactive groups of 10:1 to 0.8:1 in an ester-, thioester- or amide-forming reaction accompanied by ring opening, and
   a second reaction step wherein the reaction mixture obtained from the first step in diluted with water and stirred at room temperature or higher until a stable aqueous solution or dispersion is formed.

2. A process as claimed in claim 1 wherein the polyanhydrides (A) are anhydride-functional copolymers having a molecular weight $M_w$ in the range from 1,500 to 200,000 which have been obtained by copolymerization of
   (a) 0.1 to 45 parts by weight maleic anhydride,
   (b) 0 to 95 parts by weight monomers corresponding to the following formula

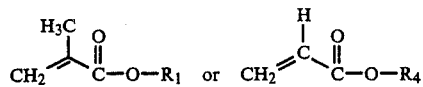

or a mixture of both,
   (c) 0 to 95 parts by weight monomers corresponding to the following formula

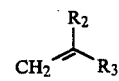

(d) 0 to 10 parts by weight polyunsaturated copolymerizable compounds;

wherein for the above formulae:
   $R_1$ and $R_4$ is, each independent of the other, an aliphatic or cycloaliphatic $C_{1-12}$ hydrocarbyl radical with or without interruptions by oxygen, sulfur or nitrogen as heteroatom,
   $R_2$ is hydrogen, methyl, ethyl, chloro or fluoro, and
   $R_3$ is an aliphatic $C_{2-15}$ hydrocarbyl, a cycloaliphatic $C_{5-10}$ hydrocarbyl, an araliphatic $C_{7-18}$ hydrocarbyl, an aromatic $C_{6-12}$ hydrocarbyl, chloro, fluoro, a nitrile or a $C_{2-18}$ hydrocarbyl which contains one or more heteroatoms selected from the group consisting of oxygen, sulfur and nitrogen in the form of ether, ester, amide, urethane, urea, thioester, thioether, oxirane, ketone, lactam or lactone groups.

3. A process as claimed in claim 1 wherein the blocked amines (B) are compounds corresponding to the following formula

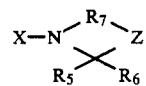

in which

X is hydrogen, $C_{1-12}$ hydroxyalkyl, $C_{1-12}$ mercaptoalkyl or $C_{1-12}$ aminoalkyl, represents —O—, —S— or —NR$_4$— wherein R$_4$ is $C_{1-6}$ alkyl, R$_5$ and R$_6$ are the same or different and each represents hydrogen or $C_{1-8}$ alkyl, or R$_5$ and R$_6$ together with the carbon atom of the heterocyclic ring form a cycloaliphatic hydrocarbon moiety containing a total of 4 to 9 carbon atoms, with the proviso that at most one of the substituents R$_5$ or R$_6$ is hydrogen, and R$_7$ is a $C_{2-6}$ alkylene, with the proviso that at least two carbon atoms are between the nitrogen atom and Z.

4. A process as claimed in claim 1 wherein the blocked amines (B) are compounds corresponding to the following formula

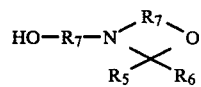

in which R$_5$ and R$_6$ are the same or different and each represents hydrogen or $C_{1-8}$ alkyl, or R$_5$ and R$_6$ together with the carbon atom of the heterocyclic ring form a cycloaliphatic hydrocarbon moiety containing a total of 4 to 9 carbon atoms, with the proviso that at most one of the substituents R$_5$ or R$_6$ is hydrogen, and each has the same meaning and each represents $C_{2-4}$ alkylene, with the proviso that at least two carbon atoms are between the nitrogen atom and the oxygen atoms.

5. A process as claimed in claim 1 wherein simultaneously with the stirring in the second step, volatile organic constituents in the mixture are removed by distillation.

* * * * *